Patented June 17, 1930

1,764,582

UNITED STATES PATENT OFFICE

KARL STAIB, OF BITTERFELD, GERMANY, ASSIGNOR TO I. G. FARBENINDUSTRIE AKTIENGESELLSCHAFT, OF FRANKFORT-ON-THE-MAIN, GERMANY

METHOD OF CARRYING OUT EXOTHERMIC REACTIONS

No Drawing. Application filed May 12, 1927, Serial No. 190,973, and in Germany July 10, 1926.

This invention relates to the method of carrying out exothermic reactions, more especially such between solid substances and gases. When effecting such reactions, the reaction heat will, in the rarest cases, exactly suffice to heat the reaction product up to a temperature at which the reaction takes place in the most favorable manner. If the reaction heat is insufficient in this respect, recourse may be taken to supplementary external heating. If, however, the reaction heat is excessive, the temperature of the reaction product may, in some cases, be increased to such a degree that the product is already melted before the ingredients have been completely transformed, so that the product still contains more or less of the initial material enclosed by the molten product whereby further transformation is prevented.

Now, according to my invention, in carrying out reactions of the kind just referred to, an inert solid substance is added to the reacting material in quantity sufficient to absorb the excess of heat produced by the reaction. Preferably the inert solid substance is added in granular form, and the size of the grains is made to substantially differ from that of the grains of the reaction product, so that the latter may easily be separated from the inert substance by sifting.

Owing to the admixture of the inert substance, the temperature of the reacting materials cannot rise above a predetermined limit, the reaction heat produced in the main reaction zone being absorbed by the inert material and therefore remaining accumulated in the furnace in the immediate proximity of the reaction product. Now the latter can only moderately be cooled down by the concentrated gas entering from below, as the admixed inert body also delivers heat and the exchange of heat between the solids and the gas is quickly completed. The course of the reaction is further favorably influenced by the fact that the gas leaving the reaction zone cannot, in its turn, highly preheat the mixture of the starting material and the inert substance piled up above the said zone, so that the mixture when reaching the reaction zone is relatively cool and the more capable of absorbing the excess of heat produced.

A further important advantage of my invention is that also a product not yet finished in the main reaction zone but converted only to a large extent has an opportunity of subsequently reacting with the entering concentrated gas for a longer time and at an elevated temperature, whereby finally a very pure reaction product is obtained.

A typical embodiment of my invention is the following, it being understood that the invention is not limited to the treatment of the particular substances nor to the manipulative or other operating details mentioned by way of example.

This example relates to the production of calcium chloride by treating a mixture of burnt lime and coal with chlorine gas. When operating in the usual way, the temperature produced by the reaction would suffice to melt the resulting calcium chloride before the whole or the main part of the calcium oxid would have been converted to calcium chloride. Now I form little bricks from burnt lime, coal and a small quantity of calcium chloride as a binding medium and mix them with about an equal quantity of retort coal reduced to coarser pieces. This mixture is piled up in a shaft furnace, and after preheating the mass, chlorine gas is introduced from below. In this way a vigorous chlorination may be maintained without any melting of the calcium chloride taking place, as the heat which otherwise would be available for this purpose is absorbed by the retort coal. The little bricks of solid calcium chloride may be withdrawn from the shaft and separated from the carbon pieces without difficulty, by passing them through a sieve having the corresponding number of meshes.

An important new and useful result of my invention is that new reactions of the kind referred to need no longer be carried out in apparatus of small size based upon radiation of the reaction heat and always furnishing a product of varying composition, but according to my invention continuously working large shaft furnaces can be used in which the production of heat may be utilized for adapting the temperature to the course of the chemical reaction.

I claim:—

1. In the continuous performance of exothermic reactions in which the reaction temperature is bound to a maximum limit, the improvement which consists in forming into pieces the mixture of substances to be reacted with the gases, loosely intermixing the said pieces with inert bodies in quantity sufficient to absorb the excess of heat produced, and separating the said pieces from the said bodies after the reaction has been completed.

2. In the continuous performance of exothermic reactions in which the reaction temperature is bound to a maximum limit, the improvement which consists in forming into pieces the mixture of substances to be reacted with the gases, loosely intermixing the said pieces with inert bodies, differing in size from the said pieces, in quantity sufficient to absorb the excess of heat produced, and separating the said pieces from the said bodies by sifting after the reaction has been completed.

3. In the continuous production of calcium chloride from lime and chlorine, the improvement which consists in forming little bricks from burnt lime, coal and a small quantity of calcium chloride, mixing them with granulated retort coal, preheating the mass and exposing the same to a current of chlorine.

4. In the continuous production of calcium chloride from lime and chlorine, the improvement which consists in forming little bricks from burnt lime, coal and a small quantity of calcium chloride, mixing them with grains of retort coal having a size different from that of the said bricks, exposing the same to a current of chlorine and separating the product by sifting.

5. In the continuous performance of exothermic reactions between solid substances and gases in which the reaction temperature is bound to a maximum limit, the improvement which consists in loosely intermixing, in a dry state, a solid reaction substance and a quantity of solid inert material sufficient to absorb the heat produced in excess, and separating, by mechanical means, said inert material from the solid product of reaction after the reaction is completed.

6. In the continuous performance of exothermic reactions between solid substances and gases in which the reaction temperature is bound to a maximum limit, the improvement which consists in loosely intermixing, in a dry state, a solid reaction substance and a quantity of solid inert material of different grain-size sufficient to absorb the heat produced in excess, and separating by sifting, said inert material from the solid product of reaction after the reaction is completed.

In testimony whereof I affix my signature.

KARL STAIB.